(12) United States Patent
Bosmans et al.

(10) Patent No.: US 8,240,467 B2
(45) Date of Patent: Aug. 14, 2012

(54) ELASTIC FIXING ELEMENT, AND COHERENT ARRANGEMENT OF SUCH ELEMENTS

(75) Inventors: Frank Bosmans, Eke (BE); Jan Bosmans, Melsele (BE)

(73) Assignee: Ghent-Supply, Eke-Nazareth (BE)

( * ) Notice: Subject to any disclaimer, the term of this patent is extended or adjusted under 35 U.S.C. 154(b) by 217 days.

(21) Appl. No.: 11/814,102

(22) PCT Filed: Jan. 4, 2006

(86) PCT No.: PCT/EP2006/000028
§ 371 (c)(1),
(2), (4) Date: Jul. 17, 2007

(87) PCT Pub. No.: WO2006/077011
PCT Pub. Date: Jul. 27, 2006

(65) Prior Publication Data
US 2008/0120816 A1 May 29, 2008

(30) Foreign Application Priority Data
Jan. 18, 2005 (FR) ..................... 05 00513

(51) Int. Cl.
*A44B 21/00* (2006.01)
*B65B 63/18* (2006.01)
(52) U.S. Cl. ...... 206/343; 24/30.5 R; 24/910; 24/16 PB; 24/17 AP

(58) Field of Classification Search .................. None
See application file for complete search history.

(56) References Cited

U.S. PATENT DOCUMENTS

| 2,943,371 | A | | 7/1960 | Patterson | |
|---|---|---|---|---|---|
| 3,048,906 | A | | 8/1962 | Patterson | |
| 3,673,639 | A | | 7/1972 | Driscoll | |
| 4,640,320 | A | * | 2/1987 | Avison et al. | 140/93 A |
| 5,081,746 | A | | 1/1992 | Czwartacki | |
| 5,893,456 | A | | 4/1999 | Bosmans | |
| 6,044,526 | A | | 4/2000 | Putney | |
| 6,976,719 | B2 | * | 12/2005 | Agayof et al. | 294/150 |
| 2001/0004055 | A1 | * | 6/2001 | Kubota et al. | 206/343 |

* cited by examiner

*Primary Examiner* — Jack W. Lavinder
(74) *Attorney, Agent, or Firm* — Ladas & Parry LLP

(57) ABSTRACT

An elastic fixing element and a coherent arrangement of such elements. These elastic fixing elements are intended in particular to hold together a first and a second element, rectilinear in particular, such as a vine shoot or a branch and a metal support wire. The elastic fixing element includes a closed loop, a head, and a neck connecting this head to the closed loop. This head is extended by a top stub. The closed loop is extended by a bottom stub, which facilitates the manual fitting of the elastic element around the elements to be secured. The coherent arrangement includes at least two elastic fixing elements. These elastic elements are connected together by a first link at the position of their respective top stubs. These elastic elements are connected together by a second link at the position of their respective bottom stubs.

7 Claims, 5 Drawing Sheets

ELASTIC FIXING ELEMENT, AND COHERENT ARRANGEMENT OF SUCH ELEMENTS

BACKGROUND OF THE INVENTION

Figure 1A:
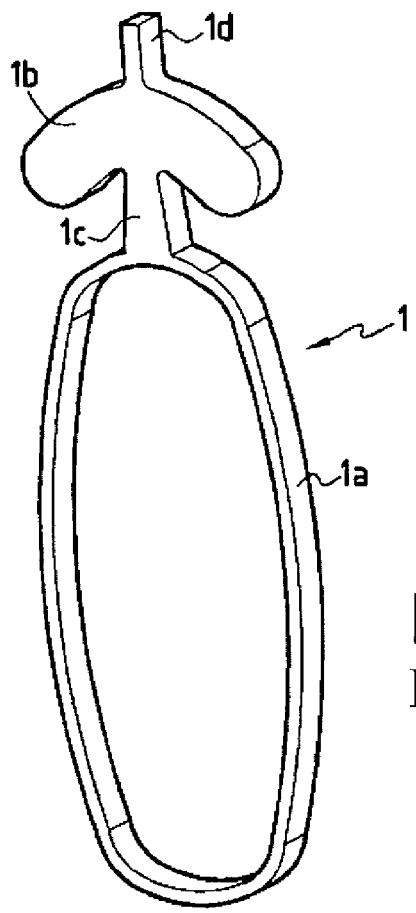

The subject of this present invention is an elastic fixing element and a coherent arrangement of these elastic fixing elements. These elements are intended in particular to hold together a first and a second element, particularly rectilinear in nature, such as a vine shoot, and a support wire. The invention therefore finds its particular application in the securing of branches such as vine shoots to a support such as a support wire.

Generally speaking, in both horticulture and wine growing, we seek to guide the growth of a plant along a support, such as a cordon a trainer, a rope, a support wire or other. This support, along which the plant is fixed, can be rectilinear or curvilinear, horizontal or vertical, and is therefore used to assist the growth of the plant. It is therefore necessary to keep the plant attached to this support at one or more places.

Most of the known securing methods and systems consist of a binding or clamping of the plant onto its support. This type of securing method and system is always accompanied by a risk of damage to the plant, or indeed of insufficiently effective clamping.

We are also familiar with elastic elements that have the advantage of reducing the risks of damaging the plant while still providing effective securing onto the support. It is possible to mention especially the elastic element, and the coherent arrangement of several of these elastic elements, described in American U.S. Pat. No. 5,893,456, held by the applicant, and taken up in this present application as an example of prior art, with reference to FIGS. 1a and 1b. Such an elastic securing element 1 includes a closed loop 1a. A head 1b is connected to the closed loop 1a by a neck 1c, and extended by a top stub 1d.

This elastic element 1 is used to secure a first element, such as a vine shoot, onto a second element, such as a support wire, by encircling with the elastic element 1 stretched around the shoot and the support wire. This encircling element is then closed by constraining the head 1b to pass into the closed loop 1a by deformation. After releasing the elastic element 1 into an unstretched state, the prominent head 1b prevents the tie from opening, since the prominent lateral parts of this head 1b are trapped in the closed loop 1a. This head 1b therefore acts as an anchor.

Figure 1B:
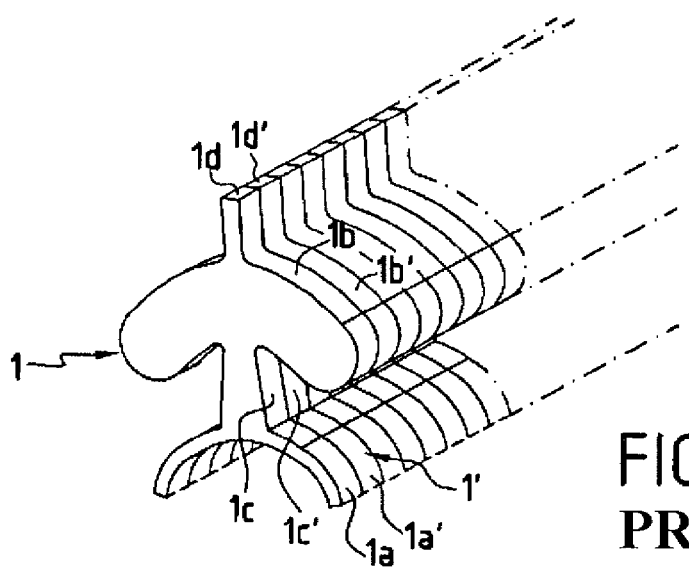

In addition, it is desirable to be in possession of a coherent arrangement of elastic elements 1, 1', such as that presented in FIG. 1b, which allows the transportation of several elastic elements while also reducing the risk of losing any. These elastic elements 1, 1' obviously have the same structure as the elastic element 1 of FIG. 1a. They are held together by a single connection at the position of their respective stubs 1d, 1d'), with a cut-out in this tie that makes it partial. Thus, in order to fit an elastic element 1, it just needs to be separated from the coherent arrangement by a tearing action.

Nevertheless, the fitting of these elastic elements is finicky and often painful work. The fitting conditions, outdoors, in areas under cultivation and in large quantities, especially in the case of wine-growing, are such that a considerable time is required to fit this type of elastic element.

If they are sufficiently strong and durable, these elastic elements are also difficult to fit by hand because of the significant force needed to stretch them during the fitting process, which renders this repeated action of fitting them a painful one.

Moreover, during the growth of the plant, it is sometimes necessary to either move the elastic element or to add a new one, which calls for regular repetition of this process for the fitting of these elastic elements.

The fitting of these elastic elements 1 by hand is all the more difficult when the stage that consists of getting the prominent head (1d) to enter into the closed loop (1a) is rendered difficult by the fact that the user is using the closed loop (1a) to stretch the elastic element 1. For as long as the head (1d) has not entered into the closed loop (1a), the elastic element 1 must be held stretched. In addition, the hand of the user pulling on the closed loop (1) impedes the passage of the head (1d) into this closed loop (1a).

Moreover, the automatic fitting of these elastic elements 1, 1' from the coherent arrangement described in FIG. 1b is rendered difficult.

Use is made in fact of a fitting device, such as that described in FIGS. 3 to 7, and that will be described in detail below.

This device includes a top arm which is equipped at one of its ends with means for the attachment of a top portion of the closed loop of the elastic element, with the top arm being mounted by its other end so as to pivot around an axis. This device also includes two bottom arms each of which is equipped at one of its ends with means for attachment of a bottom portion of the closed loop of the elastic element, with the bottom arms each being mounted by its other end to pivot around the same axis. The device also includes means to cause the top arm to rotate around the axis in a first direction of rotation, and the bottom arms to rotate in the direction of rotation of the first direction of rotation, from a first loading position up to a second fitting position of the elastic element.

Thus, in a first part of the rotation, firstly the end of the top arm, and secondly the ends of the bottom arms, are distanced from each other. Then, in a second part of the rotation, these ends draw together again until the end of the top arm passes between the ends of the bottom arms.

It is possible for the means generating the rotation to include a longitudinal rod that is movable in translation between a first rear loading position of the elastic element and a second front fitting position of the elastic element, means to bring the longitudinal rod into translation, and means to convert the translation movement of the longitudinal rod into rotation of the top and bottom arms around the axis of rotation.

The means to convert the translation movement of the longitudinal rod into rotation of the top and bottom arms around the axis of rotation can include a toothed circular element fixed to the front end of the longitudinal rod, which is free to rotate around the axis of rotation of the top and bottom arm, and which acts as the link between these arms and the longitudinal rod, and a rack element whose teeth mate with the teeth of the toothed circular element.

Thus, a translation movement of the longitudinal rod generates the rotation of the toothed circular element around the axis of rotation of the top and bottom arm. This rotation, in its turn, generates the rotation, around this same axis, of the top arm in one direction of rotation, and of the bottom arms in the direction of rotation opposite to this direction of rotation. It is possible that the means to bring the longitudinal rod into translation should include a trigger and/or an actuator.

This fitting device can also include means for the automatic return of the top and bottom arm to the first loading position of the elastic element.

These means for the automatic return of the top and bottom arms to the first loading position of the elastic element, should include a spring for example. This spring acts in opposition to the translation of the longitudinal rod from the first loading position to the second fitting position of the elastic element. It is possible that the top and bottom arms may be curved, and/or that the bottom arms are identical and parallel.

It is preferable that the distance between the end of the top arm and the axis of rotation should be less than the distance between the respective ends of the bottom arms and this axis.

It is also preferable that at least one of the means for attachment of a portion of the closed loop of the elastic element, is a lug forming a "V" or a "U" with the end of the lower or upper arms on which it is located.

This fitting device can also include a magazine for automatic loading of the elastic element.

Now the automatic fitting of these elastic elements 1, 1' from the coherent arrangement described in FIG. 1b, by means of the fitting device described above, is difficult. In fact during the loading of an elastic element 1, 1' onto this fitting device from the coherent arrangement described previously, the top arm hooks, by means of its final lug, onto the elastic element 1 in the upper part of the closed loop 1a. Secondly, the two bottom arms hook, by means of their respective lugs, onto the elastic element 1 in the lower part of the closed loop 1a. Then rotation of the top and bottom arms is used to detach the elastic element 1 from the coherent arrangement by tearing at the position for the stub 1d.

However, the elastic elements 1, 1' are not joined together at the position of the lower part of the closed loop 1a, with the latter tending to float since it is left free, so that the attachment of this lower part of the closed loop 1a by the lugs on the bottom arms of the fitting device may not be effective, since the grip of these lugs in the closed loop is not reliable.

In addition, it is possible to attach only a small part of the bottom portion of the closed loop 1a of an elastic element 1 to the adjacent elastic element 1', since the tearing action might damage this closed loop 1a, rendering the elastic element unusable.

The manual fitting of these elastic elements 1, as explained above, and the automatic fitting from a coherent arrangement of elastic elements such as that described in FIG. 1b by means of a fitting device such as that described above, therefore have a certain number of drawbacks as mentioned earlier.

There is therefore a requirement for an elastic fixing element, as well as for a coherent arrangement of such elastic fixing elements, which allows one to overcome the aforementioned drawbacks. In particular, there exists a requirement for an elastic fixing element and for a coherent arrangement of such elastic fixing elements that will facilitate both manual fitting and automatic fitting, without the risk of damaging the elastic element.

SUMMARY OF THE INVENTION

Thus, the purpose of this present invention is to overcome the aforementioned drawbacks by proposing an elastic fixing element and a coherent arrangement of such elastic elements, which firstly facilitate manual fitting by allowing easy stretching of the elastic element around a particularly rectilinear element to be encircled, and then encircling of the latter up to closure by releasing the stretching action on the elastic element after insertion of the prominent head into the closed loop of the elastic element, and secondly facilitate automatic fitting by allowing the arms of a fitting device to effectively hook onto the elastic element of a coherent arrangement in order to tear off the latter and then put it in position.

According to a first aspect, the invention therefore relates to an elastic fixing element that includes a closed loop, a head, and a neck connecting this head to the closed loop, in which the head is extended by a top stub.

The elastic fixing element of the invention is characteristic in that the closed loop is extended by a bottom stub.

Thus, the fitting of the elastic element by hand is facilitated by the presence of this bottom stub. In fact, the stage that consists of pushing the prominent head into the closed loop is facilitated by the fact that the user can grasp this bottom stub instead of directly grasping the closed loop to stretch the elastic element. As a consequence, the hand of the user no longer impedes the passage of the head into this closed loop.

It is preferable that the bottom stub should be diametrically opposite to the top stub.

It is also preferable that the elastic element should be made of rubber.

According to a second aspect, the invention also relates to a coherent arrangement with at least two elastic fixing elements according to the invention. These elastic elements are connected together by a first link at the position of their respective top stubs, so that their respective closed loops, heads and necks are not connected together.

The coherent arrangement of elastic fixing elements of the invention is characteristic in that the elastic elements are connected together by a second link at the position of their respective bottom stubs.

Thus, since the elastic elements are also connected together at the position of the bottom stub that extends the closed loop, the latter no longer tends to float since it is not left free, so that the attachment of this lower part of the closed loop by the lugs on the bottom arms of a fitting device is rendered more efficient, with the grip of these lugs in the closed loop being more reliable. In addition, the tearing action is accomplished without the risk of damaging the closed loop.

It is preferable that at least one of the first and second liaisons should be a partial link.

This partial link can be rendered partial by means, for example, of a weakening so as to further facilitate the later separation of the elastic elements by a tearing action at the position of this partial link.

BRIEF DESCRIPTION OF THE DRAWING FIGURES

Figure 2A:
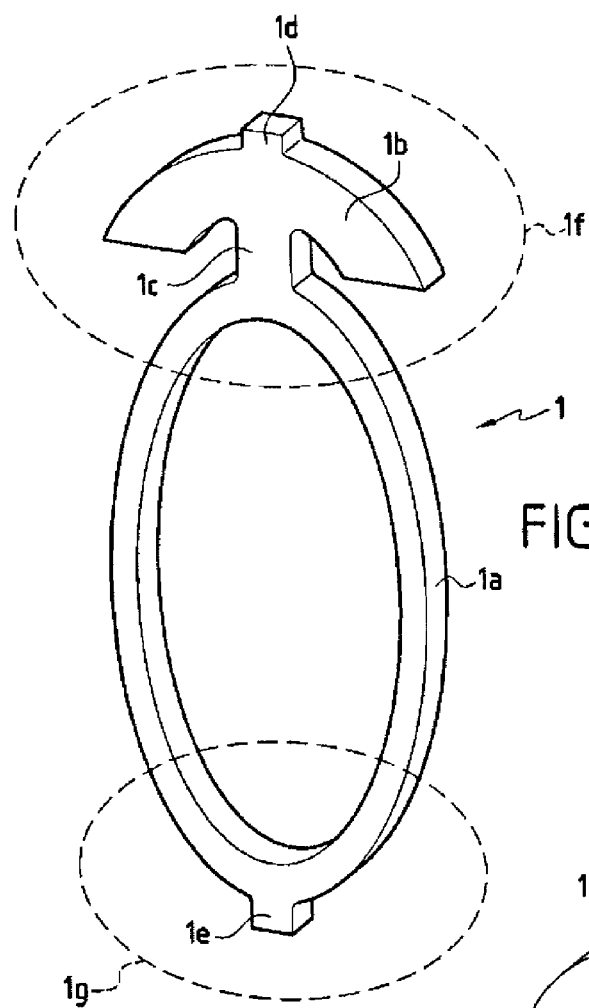
Figure 2B:
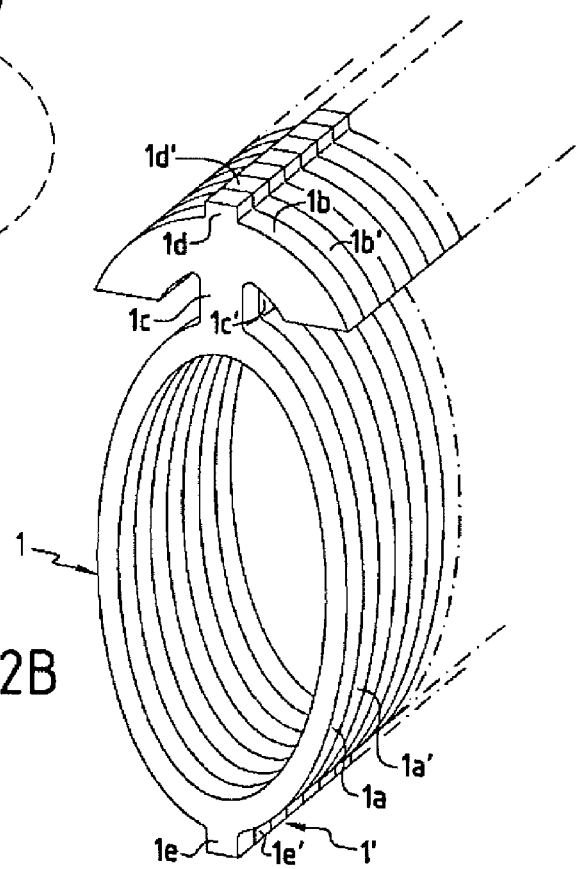

Other characteristics and advantages of the invention will appear more clearly and more fully on reading the description that follows of the preferred variants of implementation of the device and of execution of the method, these being provided by way of non-limiting examples only, and with reference to the following appended drawings:

FIG. 1a schematically represents an elastic fixing element of prior art,

FIG. 1b schematically represents a coherent arrangement of elastic fixing elements of prior art, FIG. 2a schematically represents an elastic fixing element according to the invention, FIG. 2b schematically represents a coherent arrangement of elastic fixing elements according to the invention, FIGS. 3 to 7 schematically represent a fitting device for an elastic fixing element according to the invention, at different stages of the fitting process.

DETAILED DESCRIPTION OF THE PREFERRED EMBODIMENTS

FIGS. 1a and 1b schematically and respectively represent an elastic fixing element and a coherent arrangement of such elastic elements of prior art, and have been described previously.

FIG. 2a schematically represents an elastic securing element according to the invention.

The elastic element 1 includes a closed loop 1a, a head 1b, and a neck 1 connecting the head 1b to the closed loop 1a. The head 1b is extended by a top stub 1d.

The closed loop 1a is extended by a bottom stub 1e. The latter is preferably diametrically opposite to the top stub 1d.

The elastic element 1 is naturally made from a material with elastic properties such as rubber, for example.

This elastic element 1 is therefore used for the securing in particular of a vine shoot onto a metal support wire, by encircling it with the elastic element 1 stretched around the shoot and the support wire. The encircling is then completed by constraining the head 1b to pass into the closed loop 1a by deformation. After releasing the elastic element 1 into an unstretched state, the head 1b, which is prominent and acts as an anchor, prevents the attachment from opening since the prominent lateral parts of this head 1b are trapped in the closed loop 1a.

The manual fitting of such an elastic fixing element 1 is advantageously possible due to the presence of the bottom stub 1e. In fact, this allows the user to stretch the elastic element 1 without having to pull directly on the closed loop 1a. When the user has grasped the elastic element 1 firstly by the top stub 1d and secondly by the bottom stub 1e, he can then more easily stretch the elastic element 1 and encircle the vine shoot and the support wire. Then, since he has not directly grasped the closed loop and is therefore not hindering the passage into the latter, he can more easily push the head 1b into this closed loop 1a by deformation.

FIG. 2b schematically represents a coherent arrangement of elastic fixing elements according to the invention.

This coherent arrangement includes at least two elastic fixing elements 1 and 1' as illustrated by the elastic fixing element 1 of FIG. 2a.

The elastic elements 1, 1' are connected together by a first link at the position of their respective top stubs 1d and 1d'. On the other hand, their respective closed loops 1a, 1a', heads 1b, 1b' and necks 1c, 1c' are not connected together and are therefore detached from each other.

The elastic elements 1, 1' are connected together by a second link at the position of their respective bottom stubs 1e, 1e'.

It is preferable that at least one of these two links should be a partial link, so as to facilitate the separation of the elastic elements 1, 1'. This partial link can be created by a weakening, represented in FIG. 2b by broken lines between the top stubs 1d, 1d' and between the bottom stubs 1e, 1e'. This can be a complete lateral cut, for example, but over only part of the length of the stubs. It can also be a complete longitudinal cut-out in the stubs, but incomplete laterally.

It is preferable of course that the coherent arrangement of the invention should include a number of elastic fixing elements 1, 1' of more than two, which are then connected two by two as explained above. This coherent arrangement can, for example, be created by extrusion in an elastic material such as rubber. The elastic elements 1, 1' are then created by partial lateral cuts that leave the top and bottom stubs connected two by two as explained above.

Thus, the coherent arrangement of the invention advantageously allows the use of an automatic fitting device as described below with reference to FIGS. 3 to 7. The presence of the respective bottom stubs in fact advantageously allows a bottom link to be created between the elastic elements making up the coherent arrangement, this being necessary to facilitate loading onto the automatic fitting device, without the risk of damaging the lower part of the closed loops at the moment of separation or detachment of the elastic elements.

FIGS. 3 to 7 schematically represent the fitting device for an elastic element according to invention, at different stages of the fitting procedure.

Figure 3:
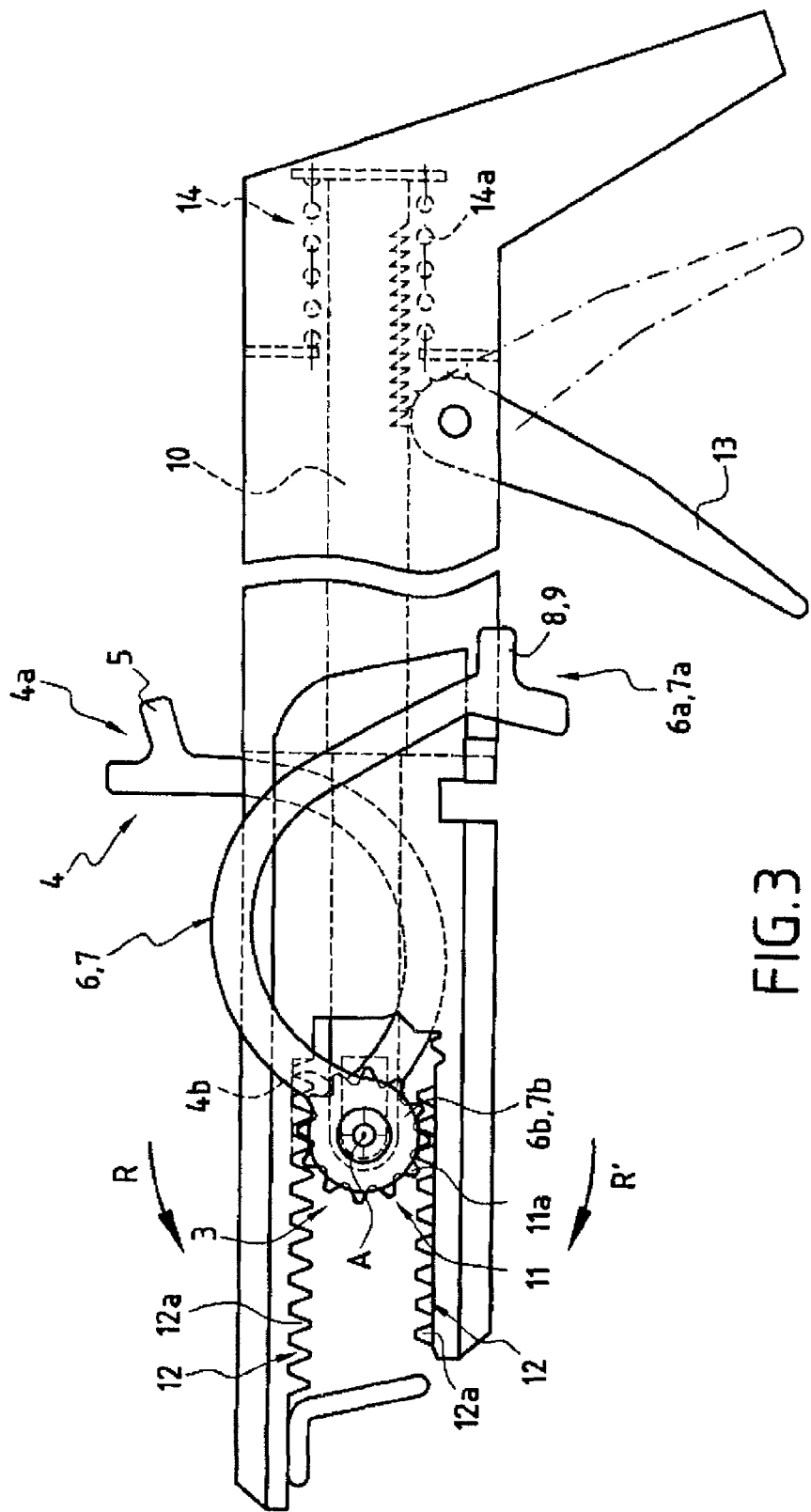

FIG. 3 schematically represents the fitting device at rest, with no elastic element loaded.

The fitting device includes a top arm 4, possibly curved, and two bottom arms 8 and 9, possibly curved, parallel and identical, which are therefore coincident in FIG. 3. At the end 4a of the top arm 4 is located a lug 5 that forms, together with this end 4a, a "U" or a "V" which is intended to hook onto a top portion of the closed loop of an elastic element. At the respective ends 6a, 7a of the bottom arms 6, 7 are located lugs 8 and 9 respectively, which therefore each forms, together with these respective ends 6a, 7a a "U" or a "V" which are intended to hook onto a bottom portion of the closed loop of an elastic element.

These top arms 4 and bottom arms 6, 7 are mounted by their other respective ends 4b, 6b, 7b to pivot around axis A. The rotation of these top arms 4 and bottom arms 6, 7 around axis A is achieved by rotation means 3.

These rotation means 3 should include, for example, a longitudinal rod 10 that is movable in translation between a first rear loading position of an elastic element and a second front fitting position of this elastic element, in particular around a vine shoot and a support wire. The translation movement of this longitudinal rod 10 is transmitted and converted into the rotation of the top arm 4 and bottom arms 6, 7 around axis A.

The conversion of this translation movement of the longitudinal rod 10 into the rotation of the top arm 4 and bottom arms 6, 7 around axis A is achieved, for example, by means of a toothed circular element such as a toothed wheel 11 whose teeth 11a mate with the teeth 12a of an element of the rack type 12.

The toothed wheel 11, fixed to the front end of the longitudinal rod 10, is free to rotate around axis A, and creates the link between the top arm 4 and firstly the bottom arms 6, 7 and secondly the longitudinal rod 10.

The translation movement of the longitudinal rod 10 is triggered by translation driving means 13 such as a manually operated trigger or indeed an automatic actuator. It is possible to provide for the use of means 14 for automatic return of the top arm 4 and bottom arms 6, 7 to the initial loading position of an elastic element. These means should include a spring 14a, for example, that acts in opposition to the translation of the longitudinal rod 10 from the first loading position to the second fitting position of an elastic element.

A trigger 13 is thus represented in FIG. 3. Movement of this trigger 13 to the rear, due to the application of sufficient pressure to the spring 14a, results in the movement of the longitudinal rod 10 in translation toward the front. A movement of this trigger 13 toward the front, after releasing the pressure on the spring 14a, therefore results in movement of the longitudinal rod 10 in translation to the rear.

Thus, the rotation means 3 described above allow the rotation, around axis A, of the top arm 4 in a direction R, and the bottom arms 6, 7 in the direction R', opposite to direction R.

As will be seen later in detail with reference to FIGS. 4 to 7, in a first part of the rotation, firstly the end 4a of the top arm 4, and secondly the respective ends 6a, 7a of the bottom arms 6, 7 are distanced from each other. Then, in a second part of the rotation, these ends come together again until the end 4a of the top arm 4 passes between the respective ends 6a, 7a of the bottom arms 6, 7.

Figure 6:
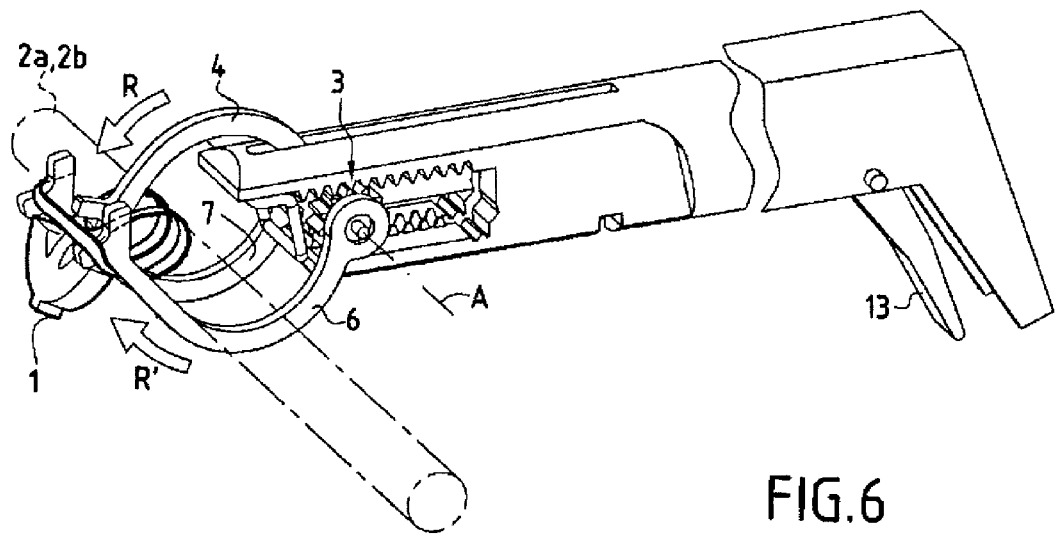

As we will also see, with reference especially to FIG. 6, the distance between the end 4a of the top arm 4 and axis A is preferably less than the distance between the respective ends 6a, 7a of the bottom arms 6, 7 and this axis A, in order to allow easier passage of the head of the elastic element held by the top arm 4 into the closed loop of the elastic element held by the bottom arms 6, 7.

Figure 4:
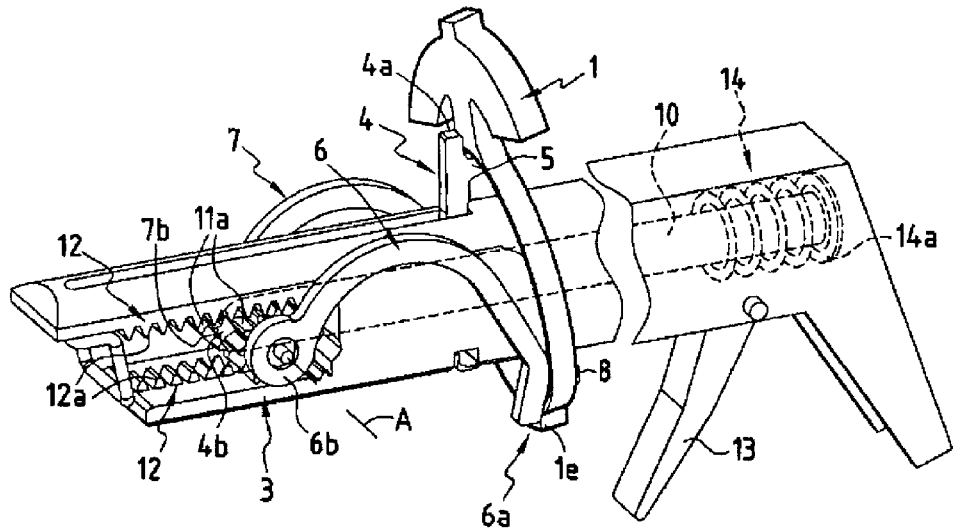

In FIG. 4, the fitting device is still represented in its rest position, but with an elastic element 1 loaded.

The loading is effected by attachment of the top portion of the closed loop of the elastic element 1 by means of the lug 5 located at the end 4a of the top arm 4, and by the attachment of the bottom portion of the closed loop of the elastic element 1 by means of the respective lugs 8 and 9 (the latter is hidden) on the ends 6a, 7a (also hidden) of the bottom arms 6, 7.

It is possible for device to be provided with a loading magazine (not shown) in which a coherent arrangement of elastic elements, such as that represented in FIG. 1b, is place so that the top arm 4 and bottom arms 6, 7 can automatically hook onto an elastic element 1 when they are in the initial loading position.

Figure 5:
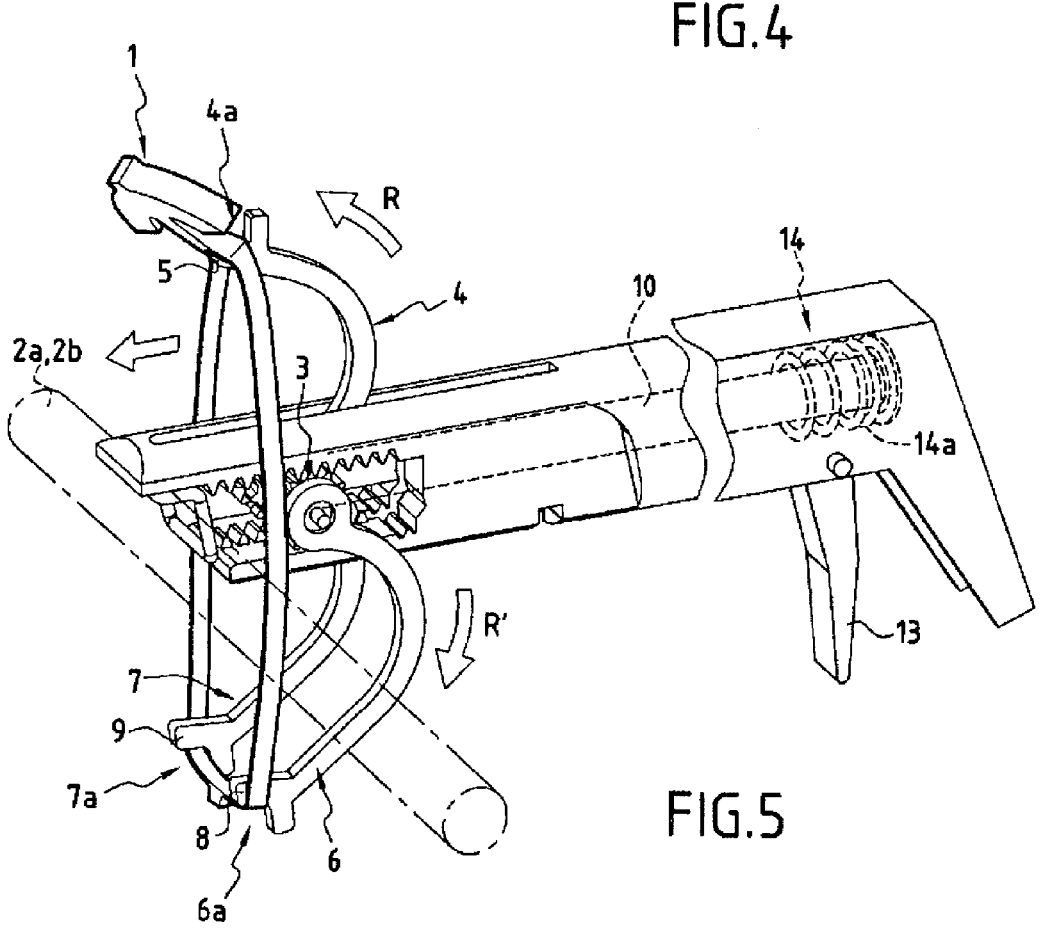

In FIG. 5, the fitting device is represented in a position in which the elastic element 1 is in a stretched state in front of assembly 2a,2b, illustrating a vine shoot 2a for example, and a metal support wire 2b (not visible in FIG. 5 for simplicity).

The passage from the state of the device represented in FIG. 4 to the state of the device represented in FIG. 5 is achieved by the first part of the rotation of the top arm 4 around axis A in direction R, and, simultaneously, by the first part of the rotation of the bottom arms 6, 7 around axis A in direction R', opposite to direction R.

It is in this first part of the rotation that firstly the end 4a of the top arm 4, and secondly the respective ends 6a, 7a of the bottom arms 6, 7, move away from each other, until the distance between these ends is maximum, so as to sufficiently stretch the elastic element 1 between its top portion and its bottom portion, which is then in front of the element 2a,2b to be encircled.

Where appropriate, if the loading is effected from a coherent arrangement of elastic elements, such as that represented in FIG. 2b, whether the latter is placed in a loading magazine or not, it is during this first part of the rotation that the elastic element 1 to be fitted is separated from the coherent arrangement of elastic elements. This stage therefore constitutes a first stage of the procedure for fitting the elastic element 1.

FIG. 6 shows the fitting device in the fitting position of the elastic element 1 around assembly 2a, 2b.

The passage from the state of the device represented in FIG. 5 to the state of the device represented in FIG. 6 is achieved by the second part of the rotation of the top arm 4 around axis A in direction R, and, simultaneously, by the second part of the rotation of the bottom arms 6, 7 around axis A in direction R' opposite to direction R.

It is in this second part of the rotation that firstly the end 4a of the top arm 4, and secondly the respective ends 6a, 7a of the bottom arms 6, 7 come together until the end 4a of the top arm 4 passes between the respective ends 6a, 7a of the bottom arms 6, 7. Thus the elastic element 1 encircles assembly 2a, 2b, thus constituting a second stage of the procedure for fitting the elastic element 1 of the invention.

Then, the head of the elastic element 1 is constrained to pass, by deformation, into its closed loop so as to achieve completion of the encircling action, thereby constituting a third stage of the procedure for fitting the elastic element 1 of the invention. Because of the elastic properties of the material used for the elastic element 1, its head will easily penetrate into the closed loop.

Where appropriate, in order to assist this passage of the head into the closed loop, the distance between the end 4a of the top arm 4 and axis A can be less than the distance between the respective ends 6a, 7a of the bottom arms 6, 7 and this axis A, as already explained above.

Figure 7:
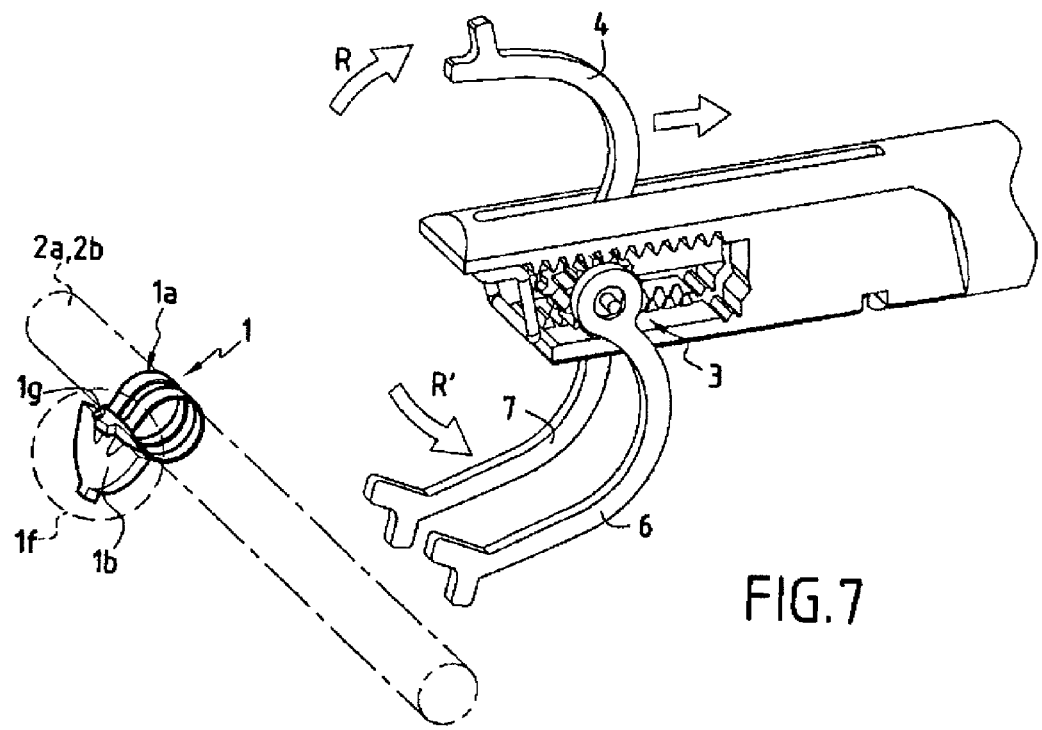

Finally, FIG. 7 represents the fitting device after fitting the elastic element 1 around assembly 2a, 2b, and while the top arm 4 and bottom arms 6, 7 have started their rotation in the reverse direction to respectively release the top portion 1f and the bottom portion 1g of the elastic element 1, and to return to their initial position.

This return to the initial position is achieved by releasing the trigger 13 of the preceding figures (not shown in FIG. 7), and aided by the spring 14a of the preceding figures (not shown in FIG. 7).

It can be seen clearly that the shape of the head 1b of the elastic element 1, which acts as an anchor, does indeed actually have an anchoring affect, and therefore guarantees long-term encircling of assembly 2a,2b, after the top arm 4 and bottom arm 6, 7 have released the elastic element 1, which then closes up.

Thus, the device and the fitting procedure of the elastic element 1 of the invention advantageously allow a large number of elastic elements to be fitted rapidly, easily and automatically, in particular for securing a vine shoot onto a support wire. This device and this fitting procedure can allow effortless, simple and rapid stretching of the elastic element 1 around assembly 2a, 2b, and encircling of the latter up to reliable and durable closure by releasing the stretching action on the elastic element 1.

All of the above description is given by way of a non-limiting example of the invention.

In particular, the general shape of the elastic element and of the fitting device do not limit the scope of the invention.

The invention claimed is:

1. A coherent arrangement with at least two stretchable elastic securing elements each stretchable elastic securing element comprising:
    an elongated element forming an elliptical closed loop having a longest diameter;
    a head adapted to be inserted into the closed loop; and
    a neck connecting the head to the closed loop,
    wherein the head is extended by a top stub graspable by a user, and the closed loop is extended by a bottom stub graspable by a user,
    wherein the bottom stub is diametrically opposite to the top stub with respect to the longest diameter of the closed loop,
    the head is such that, when firstly stretching the elastic element to encircle an other element, secondly inserting the head into the closed loop, and thirdly releasing the elastic element, the head remains trapped into the closed loop,
    wherein the stretchable elastic securing elements are directly connected together by a first link at the position of respective top stubs of the elastic elements, and where respective closed loops, heads, and necks of the elastic elements are not connected together, wherein the elastic elements are directly connected together by a second link at the position of respective bottom stubs of the elastic elements.

2. The coherent arrangement according to claim 1, wherein each elastic securing element is made of rubber.

3. The coherent arrangement according to claim 1, wherein at least one of the first and second links is a partial link.

4. The coherent arrangement according to claim 3, wherein the partial link is rendered partial by means of a weakening element, so as to facilitate the later separation of the elastic elements by a tearing action at the position of said partial link.

5. The coherent arrangement according to claim 1, wherein each elastic securing element comprises a unique bottom stub.

6. The coherent arrangement according to claim 1, wherein the directions of extension of the bottom and top stubs of each elastic securing element are coaxial.

7. A stretchable elastic securing element comprising:
an elongated element forming an elliptical closed loop having a longest diameter;
a head adapted to be inserted into the closed loop; and
a neck connecting the head to the closed loop,
wherein the head is extended by a top stub graspable-by a user and the closed loop is extended by a unique bottom stub graspable by a user, and
wherein the bottom stub is diametrically opposite to the top stub with respect to the longest diameter of the closed loop,
the directions of extension of the bottom and top stubs are coaxial, and
the head is such that, when firstly stretching the elastic element to encircle an other element, secondly inserting the head into the closed loop, and thirdly releasing the elastic element, the head remains trapped into the closed loop.

* * * * *